T. R. Vestal. App; for Removing & Replacing Wagon Beds.

No. 117,224

PATENTED JUL 18 1871

Witnesses:
John Becker
Wm. H. C. Smith

Inventor:
T. R. Vestal
per
Attorneys.

117,224

UNITED STATES PATENT OFFICE.

TILGHMAN R. VESTAL, OF SANTA FÉ, TENNESSEE.

IMPROVEMENT IN HOISTING APPARATUS.

Specification forming part of Letters Patent No. 117,224, dated July 18, 1871.

*To all whom it may concern:*

Be it known that I, TILGHMAN R. VESTAL, of Santa Fé, in the county of Maury and State of Tennessee, have invented a new and useful Improvement in Apparatus for Removing and Replacing Wagon-Beds; and I do hereby declare that the following is a full, clear, and exact description thereof, which will enable others skilled in the art to make and use the same, reference being had to the accompanying drawing forming part of this specification, in which—

Figure 1:
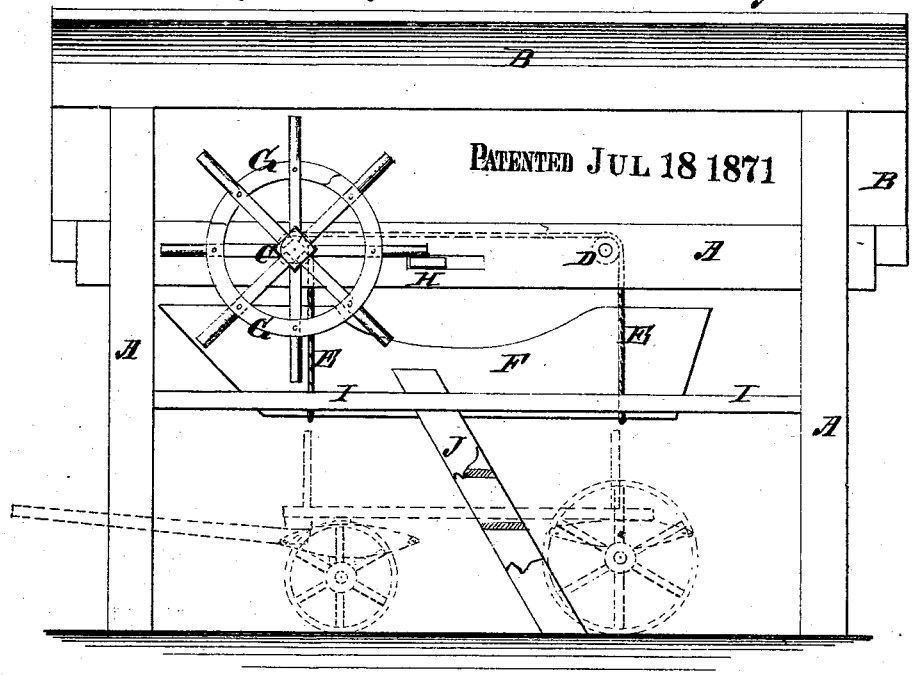
Figure 2:
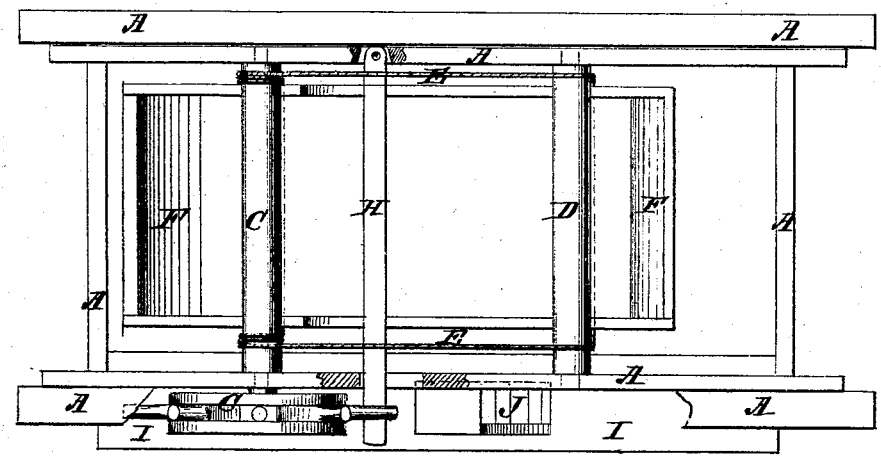

Figure 1 is a side view of my improved apparatus. Figure 2 is a top view of the same, the roof being removed.

Similar letters of reference indicate corresponding parts.

My invention consists in improved means for lifting off, holding, and letting down a wagon-body in the shed where it is generally kept, as hereinafter fully described and subsequently pointed out in the claim.

A represents the frame, and B the roof of a wagon-shed or house. C D are two shafts or rollers pivoted to the frame A or to timbers attached to said frame. The rollers C D are placed at such a distance apart that one may be over the forward and the other over the rearward part of the wagon-bed or body, when a wagon may be run beneath them. E is a single rope, which is passed through two holes in the shaft or roller C near its ends, so as to form a shorter and longer loop. The rope E is secured to the shaft C so that when the said shaft is revolved the two loops of the rope E may be wound upon it with equal rapidity. The shorter loop of the rope E is designed to be passed beneath one end of the wagon-body or bed F, and the other or longer loop is passed over the roller D and beneath the other end of the body or bed F of the wagon, so that by turning the shaft C in one or the other direction the wagon-bed will be raised or lowered, as desired. To one end of the shaft C is attached a wheel, G. The outer ends of the spokes of the wheels project beyond the rim to serve as handles in turning the said wheel. I prefer to make the wheel G with eight spokes, the inner ends of four of which enter the sides of the squared end of the shaft C. The inner ends of the other four spokes are notched to fit upon the angles or corners of the said squared end of the shaft C. The rim of the wheel consists of two ring-plates attached to the sides of the spokes near their outer ends, so as to hold the said spokes in place upon the shaft C and in their proper relative positions with respect to each other. H is a bar, one end of which passes through a slot in the timber to which the shafts C D are pivoted, and projects so much that by moving it toward the wheel G it may pass between the projecting ends of the spokes of said wheel to hold it securely in any position into which it may be turned, and by moving the said projecting end of the bar H from the wheel G the said wheel will be released so that it may be turned in either direction. The other end of the bar H is pivoted to the other timber to which the rollers C D are pivoted, or to some other suitable support. I is a platform attached to the frame A for the man to stand upon when operating the wheel G to raise or lower the wagon-bed. J is a ladder or steps for convenience in ascending to and descending from the platform I, and which should be placed in such a position as to be as much as possible out of the way.

Having thus described my invention, I claim as new and desire to secure by Letters Patent—

1. The arrangement, in the shed A B, of the two pivoted rollers C D, the single rope E, and hand-wheel G, as and for the purpose specified.

2. The improved hand-wheel G consisting of two ring-plates, combined with four spokes attached to the center of the sides of the shaft, and other four notched and fitted upon the corners thereof, as set forth.

3. In combination with shed A B, rollers C D, rope E, and wheel G, the sliding bar H, arranged as and for the purpose specified.

TILGHMAN R. VESTAL.

Witnesses:
W. O. GORDON,
JOHN N. MERONEY.